United States Patent
Osesina et al.

(10) Patent No.: US 10,248,875 B2
(45) Date of Patent: Apr. 2, 2019

(54) METHOD FOR AUTOMATICALLY DETECTING AND REPAIRING BIOMETRIC CROSSLINKS

(71) Applicant: Aware, Inc., Bedford, MA (US)

(72) Inventors: Olukayode Isaac Osesina, Lincoln, MA (US); Louis Scott Hills, Stow, MA (US); Taras P. Riopka, Concord, MA (US)

(73) Assignee: AWARE INC., Bedford, MA (US)

(*) Notice: Subject to any disclaimer, the term of this patent is extended or adjusted under 35 U.S.C. 154(b) by 870 days.

(21) Appl. No.: 14/300,277

(22) Filed: Jun. 10, 2014

(65) Prior Publication Data

US 2014/0372465 A1  Dec. 18, 2014

Related U.S. Application Data

(60) Provisional application No. 61/835,149, filed on Jun. 14, 2013.

(51) Int. Cl.
*G06K 9/00* (2006.01)
(52) U.S. Cl.
CPC .................. *G06K 9/00892* (2013.01)
(58) Field of Classification Search
CPC .............. G06K 9/00892; G06F 17/30528
USPC ........................................ 707/758
See application file for complete search history.

(56) References Cited

U.S. PATENT DOCUMENTS

| | | | |
|---|---|---|---|
| 6,449,612 B1* | 9/2002 | Bradley | G06F 17/3061 |
| 2013/0083975 A1 | 4/2013 | Partington et al. | |
| 2013/0138652 A1* | 5/2013 | Bigdeli | G06K 9/00892 |
| | | | 707/737 |
| 2013/0238623 A1* | 9/2013 | Wyllie et al. | G06F 17/30598 |
| | | | 707/737 |
| 2013/0297635 A1* | 11/2013 | Bayliss | G06F 17/30303 |
| | | | 707/758 |

* cited by examiner

*Primary Examiner* — Jensen Hu
(74) *Attorney, Agent, or Firm* — Jason H. Vick; Sheridan Ross, PC

(57) ABSTRACT

Systems and methods for repairing cross-linked biometric records receive a set of biometric records. Each biometric record contains at least one biometric sample in a non-textual modality. One or more of the biometric records in the set of biometric records is potentially a cross-linked biometric record having at least two biometric samples that are associated with different individuals. Crosslink resolution is performed on the set of biometric records by searching for a match between a biometric sample in a given non-textual modality of a given biometric record with each biometric sample of the same given non-textual modality in each of the other biometric records in the set of biometric records. During the crosslink resolution, biometric sample may be removed from one biometric record and merged with another biometric record.

24 Claims, 14 Drawing Sheets

METHOD FOR AUTOMATICALLY DETECTING AND REPAIRING BIOMETRIC CROSSLINKS

RELATED APPLICATION

This application claims the benefit of and priority to U.S. provisional application No. 61/835,149, filed Jun. 14, 2013, titled "Method for Automatically Detecting and Repairing Biometric Crosslinks," the entirety of which application is incorporated by reference herein.

FIELD OF THE INVENTION

The invention relates generally to person identification. More specifically, the invention relates to systems and methods of identity resolution using biometric and biographic feature matching.

BACKGROUND

A "biometric crosslink" is defined as a biometric record that has biometrics and/or data (i.e., biographic information) collected from more than one person. A biometric crosslink record can occur if the workflow for the multimodal biometric capture process is such that biometrics from different modalities or subjects becomes intermixed in a multimodal biometric record. Biometric crosslink records can occur wherever there is potential for enrollment processes to be compromised, such as, for example, in hostile enrollment environments or in places with inadequate enrollment quality control.

Biometric crosslink records compromise the integrity of a biometric data repository and create challenges for identification or verification processes, because only a subset of a subject's modalities may be matched in the same record. Consequently, it degrades the performance of an ABIS (Automatic Biometrics Identification System) and impedes overall operational effectiveness.

Repair of biometric crosslinks can be complex, computationally intensive and time consuming because of the potentially large number of possible combinations and the exponentially increasing nature of the number of required comparisons. For example, repairing n crosslinked records requires $n^m$ comparisons, where m is the number of different modalities.

SUMMARY

In one aspect, the invention features a method of repairing cross-linked biometric records. The method comprises receiving a set of biometric records. Each biometric record contains at least one biometric sample in a non-textual modality. One or more of the biometric records in the set of biometric records is potentially a cross-linked biometric record having at least two biometric samples that are associated with different individuals. Cross-link resolution is performed on the set of biometric records by searching for a match between a biometric sample in a given non-textual modality of a given biometric record with each biometric sample of the same given non-textual modality in each of the other biometric records in the set of biometric records.

In another aspect, the invention features computer program product for repairing cross-linked biometric records. The computer program product comprises a non-transitory computer readable storage medium having computer readable program code embodied therewith. The computer readable program code comprises computer readable program code that, if executed, receives a set of biometric records, each biometric record containing at least one biometric sample in a non-textual modality. One or more of the biometric records in the set of biometric records is potentially a cross-linked biometric record having at least two biometric samples that are associated with different individuals. The computer readable program code further comprises computer readable program code that, if executed, performs cross-link resolution on the set of biometric records to repair each cross-linked biometric record in the set by searching for a match between a biometric sample in a given non-textual modality of a given biometric record with each biometric sample of the same given non-textual modality in each of the other biometric records in the set of biometric records.

In still another aspect, the invention features a computer system comprising memory storing program code that, if executed, performs cross-link resolution on biometric records, and a processor programmed to receive a set of biometric records. Each biometric record contains at least one biometric sample in a non-textual modality. One or more of the biometric records in the set of biometric records is potentially a cross-linked biometric record having at least two biometric samples that are associated with multiple different individuals. The processor executes the program code stored in memory to perform cross-link resolution on the set of biometric records to repair each cross-linked biometric record in the set. The cross-link resolution includes searching for a match between a biometric sample in a given non-textual modality of a given biometric record in the set of biometric records with each biometric sample of the same given non-textual modality in each of the other biometric records in the set.

BRIEF DESCRIPTION OF THE DRAWINGS

The above and further features and advantages may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Systems and methods described herein embody a methodology for automatically repairing biometric crosslinks using the principles and techniques of entity resolution. In general, entity resolution is the process of determining if multiple references refer to the same real world individual. Traditionally, the techniques of entity resolution have been applied to textual records. The methodology described herein extends the principles of entity resolution to non-textual modalities. In addition, this methodology introduces two techniques, not employed in traditional entity resolution, to handle the challenge of biometric records containing textual and non-textual modalities referring to more than one individual. These two techniques are called "modality split" and "modality merge."

A "modality split" is a process of removing a modality from a biometric record, and involves determining if a particular modality belongs to the biometric record in which it is found, whether the particular modality should be removed from the biometric record, and how the removed modality is handled. The modality split process can be adapted to avoid generating orphaned modalities. An orphaned modality is a biometric record containing a single modality.

A "modality merge" is a process of adding a modality to a biometric record. The modality merge process involves clustering biometric samples of a given modality that have been determined to match, and handling non-transitive closure in matching (i.e., A matches B and B matches C; however A does not match C).

A result of the repair process is a set of records, wherein each record in the set contains the highest known quality biometric samples and information regarding one individual only, and wherein a minimal number of records in the set have an orphaned modality.

Figure 1:
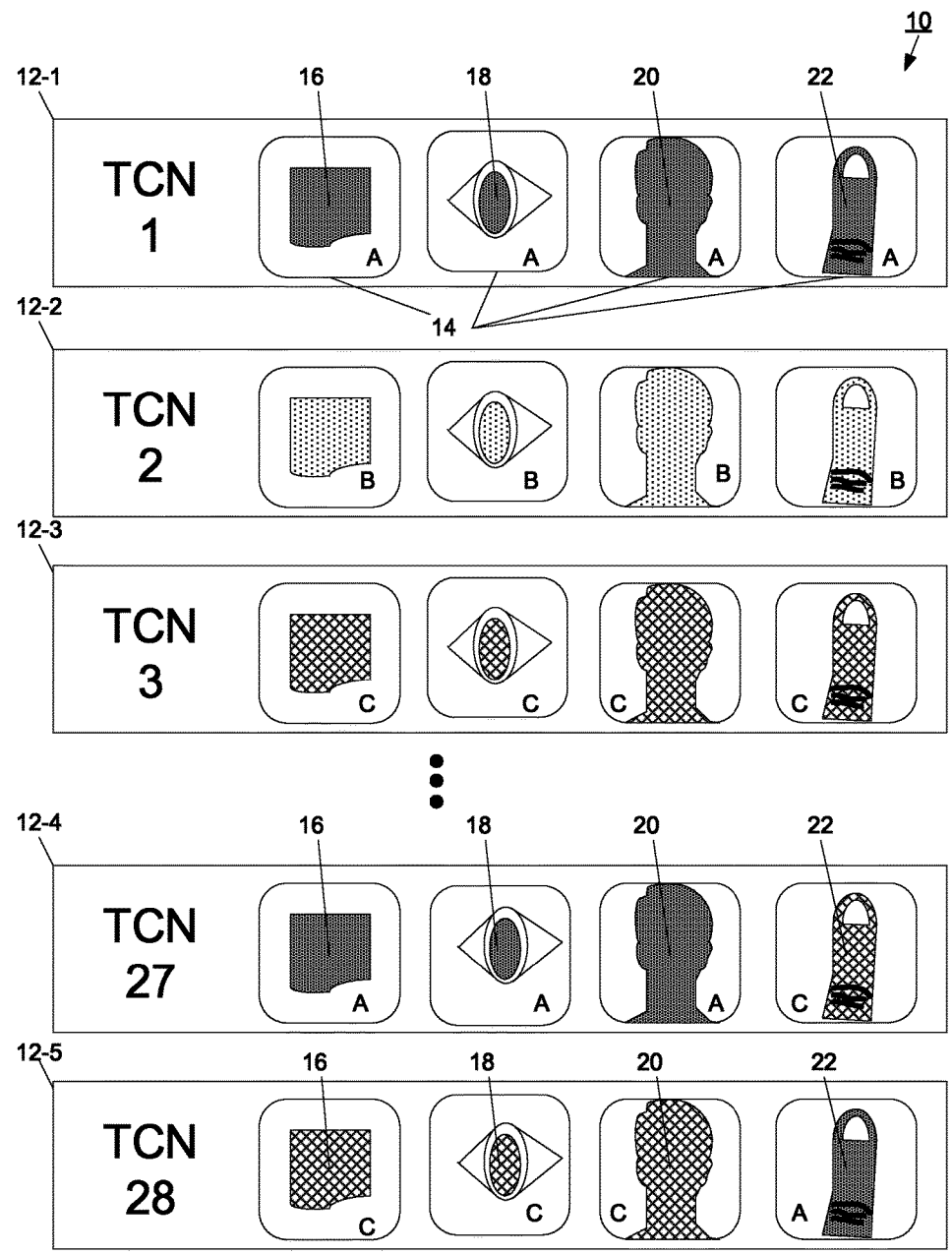
FIG. 1 is a diagram of a set of multimodal biometric records, which include examples of biometric crosslink records.

FIG. 1 shows an example of a set 10 of multimodal biometric records 12-1, 12-2, 12-3, 12-4, and 12-5 (referred to generally as biometric record 12). In this example, biometric records 12-1, 12-2, and 12-3 are undivided, each containing biometric data for a single subject only, whereas biometric records 12-4 and 12-5 are cross-linked. For instance, each of the modalities 14 of biometric record 12-1, identified by Transaction Control Number (TCN) 1, is associated with the same subject A. These example modalities 14 include, but are not limited to, biometric information 16, iris image(s) 18, face image(s) 20, and fingerprint(s) 22. Similarly, each of the modalities 14 of biometric record 12-2, identified by TCN 2, is associated with the same subject B, and each of the modalities 14 of biometric record 12-3, identified by TCN 3, is associated with the same subject C. (Different fill patterns, such as crosshatching, sparse dots, and dense dots represent the different subjects for each particular biometric data type). Although described herein with respect to text, iris, face and fingerprint images, the principles can extend to other types of modalities, including, but not limited to, DNA, retina, and voice.

In contrast, cross-linked biometric record 12-4, identified by TCN 27, contains biographic information 16, an iris image 18, and a face image 20 from a first subject (A) and fingerprints 22 from a different subject C. Biometric record 12-5, identified by TCN 27, illustrates another example of a biometric crosslink record because the record 12-5 contains biographic information 16, an iris image 18, and a face image 20 from subject C and fingerprints 22 from a different subject A.

Figure 2:
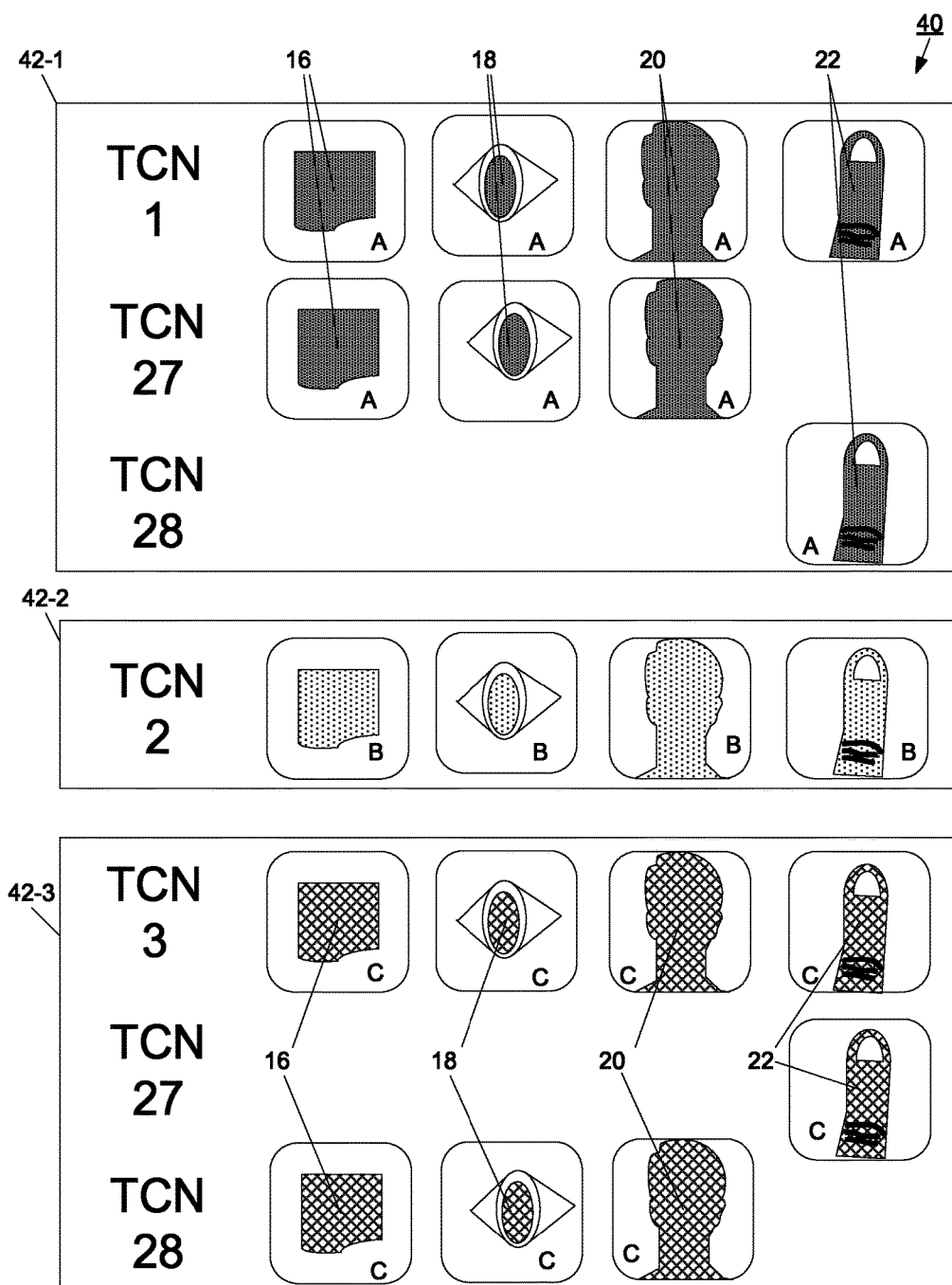
FIG. 2 is a diagram of a resulting set of repaired biometric records based on the original set of biometric records shown in FIG. 1.

FIG. 2 shows an example of a resulting set 40 of repaired biometric records based on the original set 10 of biometric records 12-1, 12-2, 12-3, 12-4, and 12-5 shown in FIG. 1. The resulting set 40 includes biometric records 42-1, 42-2, and 42-3 (generally, 42), each of which is undivided, that is, without any crosslinks because all modalities of biometric data in each biometric record 42 is associated with a single subject only. For example, biometric record 42-1 is an aggregation of all instances of biometric data in the original set 10 associated with subject A. This aggregation includes all modalities 14 taken from biometric record 12-1 (TCN 1), the biometric information 16, iris image 18, and face image 20 taken from biometric record 12-4 (TCN 27), and the fingerprint image 22 taken from biometric record 12-5 (TCN 28).

Biometric record 42-2 is an aggregation of all instances of biometric data in the original set 10 associated with subject B. In this instance, biometric record 42-1 matches biometric record 12-2 (TCN 2), because no biometric records in the original set 10 other than biometric record 12-2 contains biometric data associated with subject B.

Biometric record 42-3 is an aggregation of all instances of biometric data in the original set 10 associated with subject C, including all modalities 14 taken from biometric record 12-3 (TCN 3), the fingerprint image 22 taken from biometric record 12-4 (TCN 27) and the biometric information 16, iris image 18, and face image 20 taken from biometric record 12-5 (TCN 28).

Figure 3:
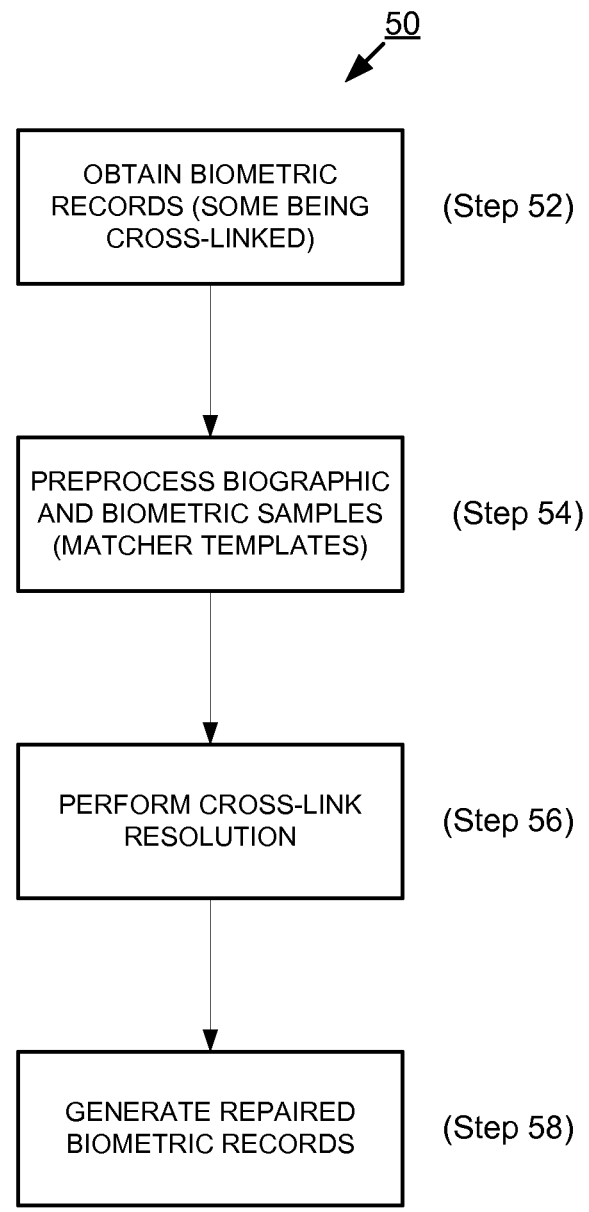
FIG. 3 is a flow diagram of an embodiment of a process for repairing biometric crosslink records.

FIG. 3 shows an embodiment of a general process 50 for repairing biometric crosslink records. The process 50 involves obtaining (step 52) a set of biometric records, which, for purposes of illustration, has an unknown number of biometric cross-linked records, preprocessing (step 54) the record fields used for comparison (e.g., creating fingerprint templates and segmentation of fingerprint images), performing (step 56) cross-link resolution by applying entity resolution principles to repair the biometric cross-linked records, and producing (step 58) the repaired biometric records. The first two stages (steps 52, 54) in the process 50 convert biometrics records into formats that can be mapped to traditional entity resolution inputs, while the repair work is performed at the cross-link resolution stage (step 56). Step 58 includes saving the results of the process 50, which includes repaired biometric records.

Figure 4A:
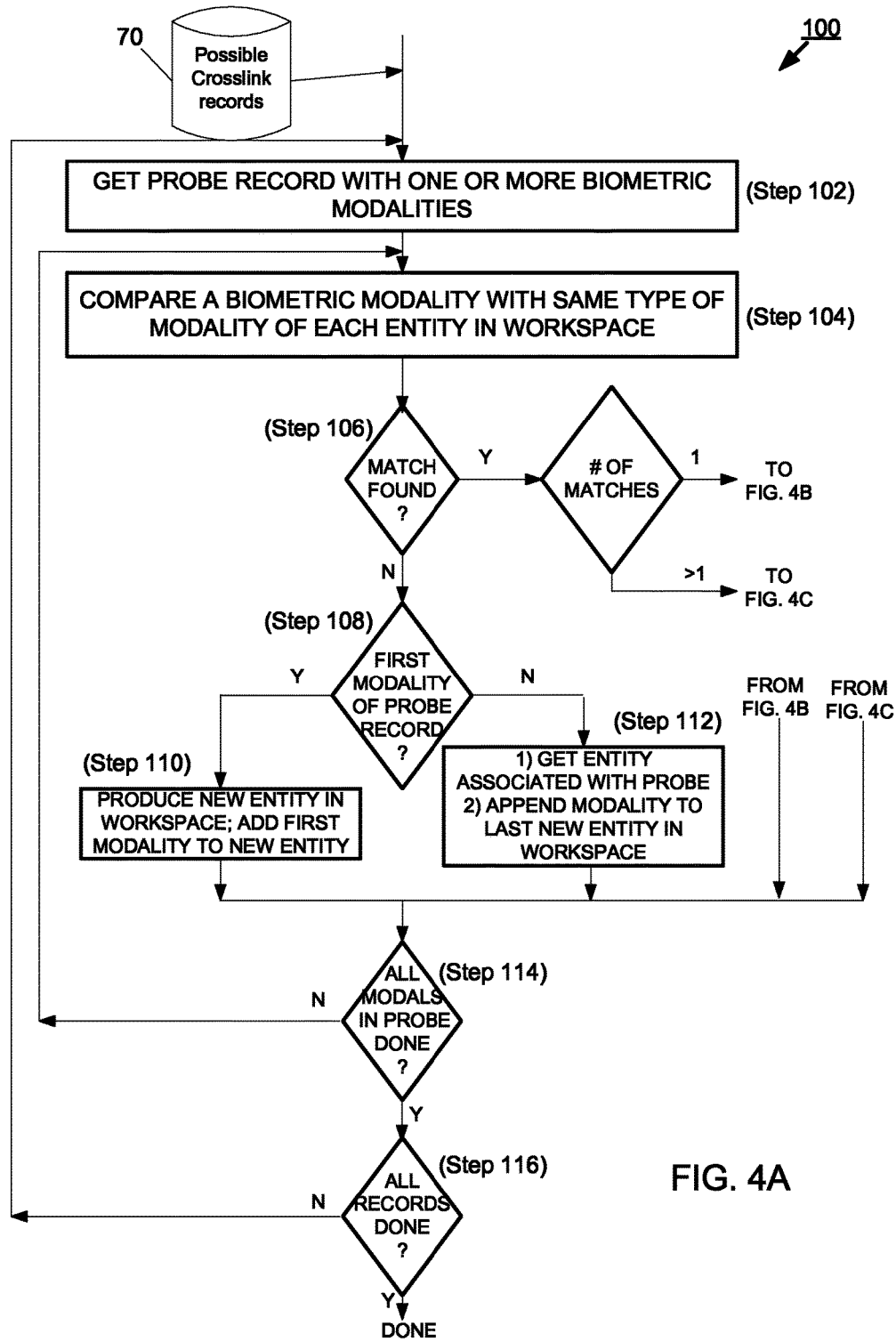
FIG. 4A, FIG. 4B, and FIG. 4C comprise a flow diagram of an embodiment of a process for detecting and repairing cross-linked biometric records.
Figure 4B:
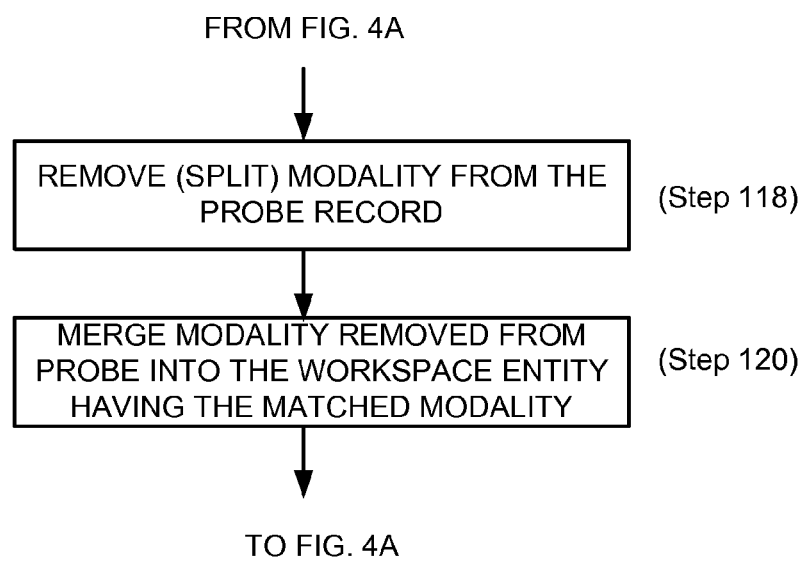
Figure 4C:
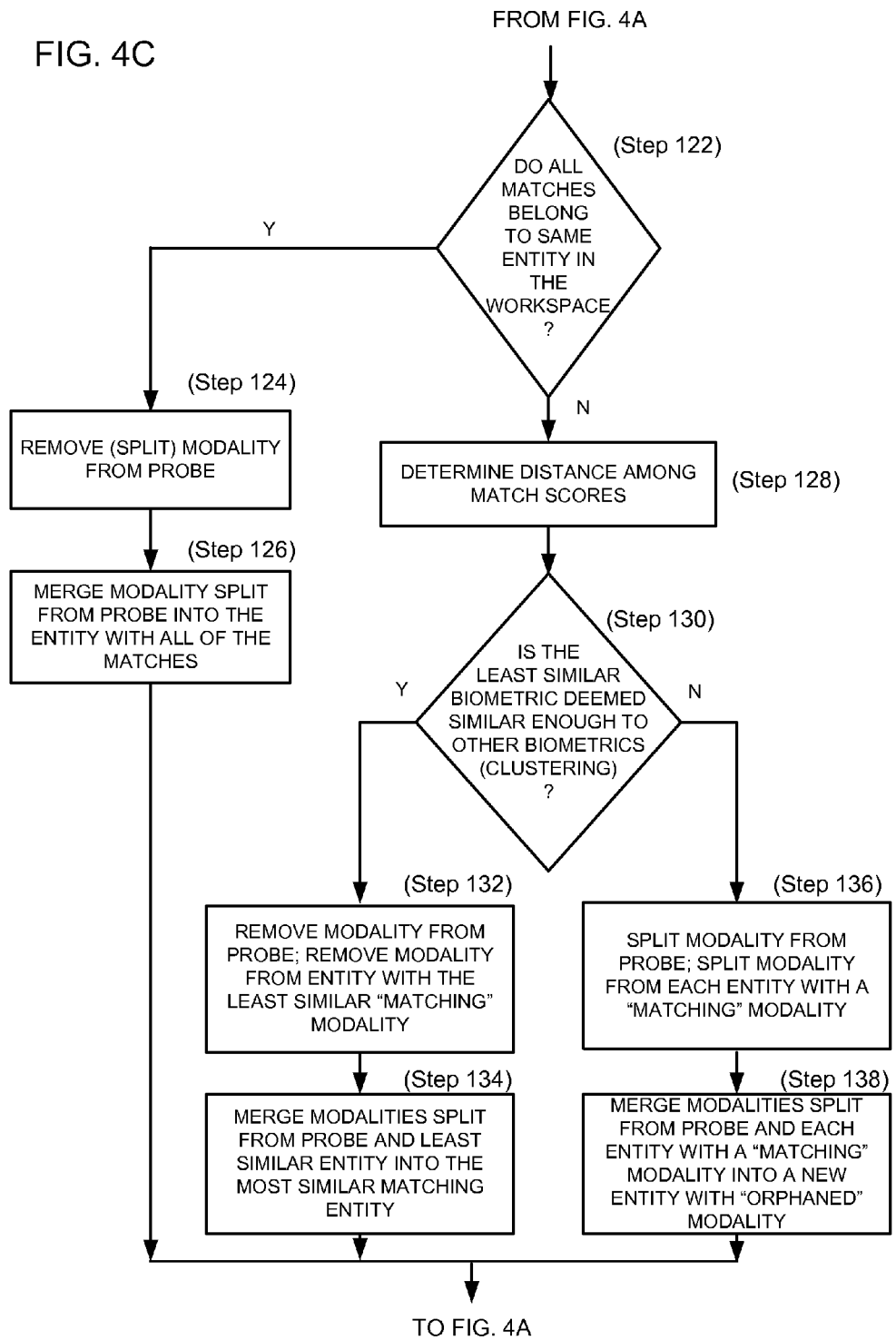

FIG. 4A, FIG. 4B, and FIG. 4C together show an embodiment of a process 100 for detecting and repairing cross-linked biometric records. For the process 100, a workspace in memory is defined, for temporarily storing new biometric records, referred to as entities. These entities are works-in-progress: biometric modalities can be added or removed from a given workspace entity throughout the execution of the process 100. Initially, the workspace is empty.

Referring to FIG. 4A, a probe record is taken (step 102) from a set of biometric records stored in a data repository 70. The set of biometric records may have one or more cross-linked biometric records. The modifier "probe" serves here to identify the particular biometric record currently being analyzed. The probe record has one or more biometric samples in one or more modalities (referred to as "biometric modality", for short).

A biometric modality of the probe record is compared (step 104) with the same type of biometric modality in each entity in the workspace. Entities in the workspace may or may not have a biometric sample of the same modality. The number of matches found determines the treatment of this biometric modality of the probe record. The process of searching for matches between non-textual biometric modalities does not require an exact match. It is sufficient that a comparison between biometric modalities produces a match score above a specified biometric matcher threshold in order for a match to be declared. The higher the score, the stronger the match. Different modalities generally have different biometric matcher thresholds. Each biometric matcher threshold can be a preset configuration parameter.

If, at step 106, no match is found, and, at step 108, this is the first biometric modality of the probe record being analyzed, a new entity is produced (step 110) in the workspace and the first biometric modality of the probe record is added to the new entity. If no match is found (step 106) and this is not the first modality of the probe record (step 108), the process 100 acquires (step 112) the workspace entity associated with the probe record and appends the biometric modality to that existing entity.

If, at step 114, the current modality is the last of the modalities in the probe record, the process 100 returns to acquiring (step 102) the next probe record from the set of biometric records 70; otherwise the process continues to acquire (step 104) the next modality from the probe record. If, however, at step 116, all biometric records have already been analyzed, the process 100 terminates. It is to be understood that before the process terminates one or more actions can be taken, for example, storing the entities in the workspace in the database (data repository) 70, outputting results onto a screen, preparing a report identifying changed biometric records, transmitting the report over a network.

Referring back to step 106, if, instead, only one match is found between the biometric modality of the probe record and a biometric modality of an entity in the workspace, the process 100 can take one of three actions, depending upon a preferred implementation of the process 100: 1) split the biometric modality from the probe record and merge it with the workspace entity; 2) split the biometric modality from workspace entity and add it to the probe record; or 3) split the matching biometric modalities from both the workspace entity and the probe record, and generate a new workspace entity that includes these two biometric modalities. The third option is least preferred, as the operation produces an "orphaned modality", namely, a biometric record with only one type of biometric modality. Biometric records with orphaned modalities are generally inadequate, in and of themselves, to identify an individual because they have only one type of biometric modality (although it can have multiple biometric samples of that one modality type). Notwithstanding, biometric records with orphaned modalities can still be used in resolving cross-linked biometric records.

FIG. 4B illustrates the first of the three options. At step 118, the biometric modality is removed from the probe record. At step 120, the biometric modality that was removed from the probe record is added to the workspace entity with the matching biometric modality. After adding the biometric modality of the probe record to the workspace entity, the process 100 resumes with acquiring the next biometric modality of the probe record, if any, or the next probe record in the database 70, if any, as illustrated by step 114 and step 116, respectively, of FIG. 4A.

Referring again back to step 106 of FIG. 4A, if, instead, multiple matches are found between the biometric modality of the probe record and biometric modalities of one or more entities in the workspace, the process 100 proceeds to determine how to split and merge the matching modalities. Referring now to FIG. 4C, the process 100 determines (step 122) whether all of the matches are with a single entity in the workspace. If all matches are with one workspace entity, the biometric modality is split (step 124) from the probe record and merged (step 126) with that workspace entity.

Alternatively, when the biometric modality of the probe record matches modalities of multiple entities in the workspace, distances (step 128) among the match scores are used to determine the probability that all the matched modalities are equivalent, thereby establishing if transitive closure exists. Suppose that the distances analysis indicates that all matched modalities are equivalent (i.e., transitive closure), those modalities (including the one from the probe record) are merged and assigned to one of the multiple matching entities in the workspace. It is assumed that modalities from the same encounter are more likely to belong to the same individual relative to modalities from other encounters; hence keeping the maximum number of modalities from the same probe record (encounter) together, where possible, is of primary influence to the decision of the particular entity in the workspace to which the modalities should be assigned. Secondarily, other considerations, such as entities with the highest number of encounters with a defined maximum modality set (count of encounters where a defined maximum set of modalities are contained in the same entity); can be used for further disambiguation. Hence, it is determined which of these workspace entities contains the largest set of modalities from the encounter(s) that produced the matched modality and all matching modalities (from the probe record and other workspace entities) are merged in that workspace entity.

For example, consider an iris modality in a probe record that matches iris modalities in three workspace entities (E1, E2, and E3). Consider further that entity E1 contains 3 out of 5 modalities from the probe record that produced the matching iris, entity E2 contains 2 out of 5 modalities, and entity E3 contains 1 out of 5 modalities. Following the primary objective mentioned above; merging to the entity E1 best satisfies keeping the maximum number of modalities from the same probe record together. The process splits the iris modality from each of the entities E2 and E3 and merges those iris modalities with the entity E1. If a new workspace entity is created because of processing the probe record, the above decision to merge the iris modalities with the entity E1 is reexamined. The decision can be made in support of re-assigning the iris modalities to the newly created entity if it is determined that the newly created entity contains, for example 4 out of 5 modalities (including the iris modality).

Accordingly, at step 130, it is determined whether the least similar biometric modality is similar enough to the other biometric modalities. If this determination is affirmative, the biometric modality is removed (step 132) from the probe record and the least similar biometric modality is removed from the workspace entity with the least similar matching modality. Both of these removed biometric modalities are then added (step 134) to the workspace entity having the most similar matching modality.

Alternatively, if, at step 130, the least similar biometric is not similar enough to the other biometrics, the biometric modality is removed (step 136) from the probe record and the corresponding matching biometric modality is removed from each of the workspace entities. These removed biometric modalities are added (step 138) to a new workspace entity, which thus has an orphaned modality.

FIGS. 5A-5G together show an example of the process 100 applied to a small set of biometric records 12 (in this example, six, labeled TCN 1 through TCN 6). In FIGS. 5A-5G, modalities of the same fill pattern are presumed to belong to the same individual (i.e., person). A letter designation (A-D) in each modality complements the fill pattern for purposes of showing which modality belongs to which individual. For example, TCN 1 has text, a face image, fingerprint, and iris image belonging to the same individual.

In general, the process 100 iteratively steps through the biometric records 12, treating each biometric record in sequence and searching, for each modality in that biometric record, for matches among the entities presently occupying the workspace 150. Accordingly, each of the biometric records 12, from TCN 1 through TCN 6, are, in turn, analyzed as the probe record against those entities presently in the workspace 150. For purposes of illustrating the principles of the process 100, modalities of the same fill pattern are presumed to match.

Figure 5A:
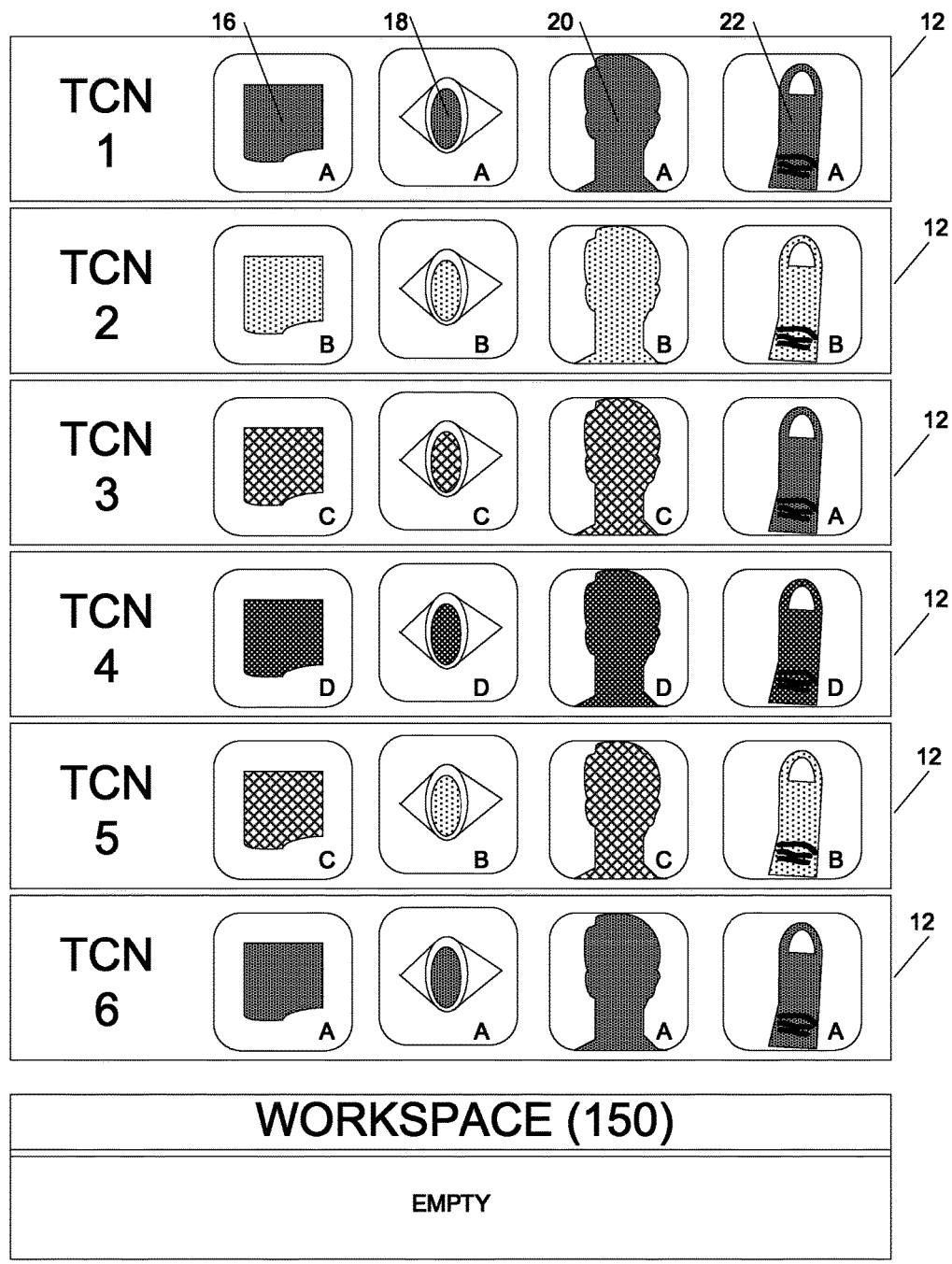
FIG. 5A, FIG. 5B, FIG. 5C, FIG. 5D, FIG. 5E, FIG. 5F, and FIG. 5G comprise a series of diagrams of a small set of biometric records undergoing the process of cross-link resolution described in connection with FIG. 4A, FIG. 4B, and FIG. 4C.

FIG. 5A shows the set of six biometric records before the process 100 runs. Initially, the workspace 150 is empty. Each TCN biometric records 12 corresponds to a human encounter, referred to as a human intervention. In this example, each of the TCN biometric records 12 includes text information 16, an iris 18, a face image 20, and a fingerprint 22. The text information is referred to as a textual modality, whereas face images, fingerprints, and irises are examples of non-textual modalities. Fingerprint samples can be partial or full. The principles extend to other examples of modalities, such as full or partial palm prints and a full or partial foot prints.

Figure 5B:
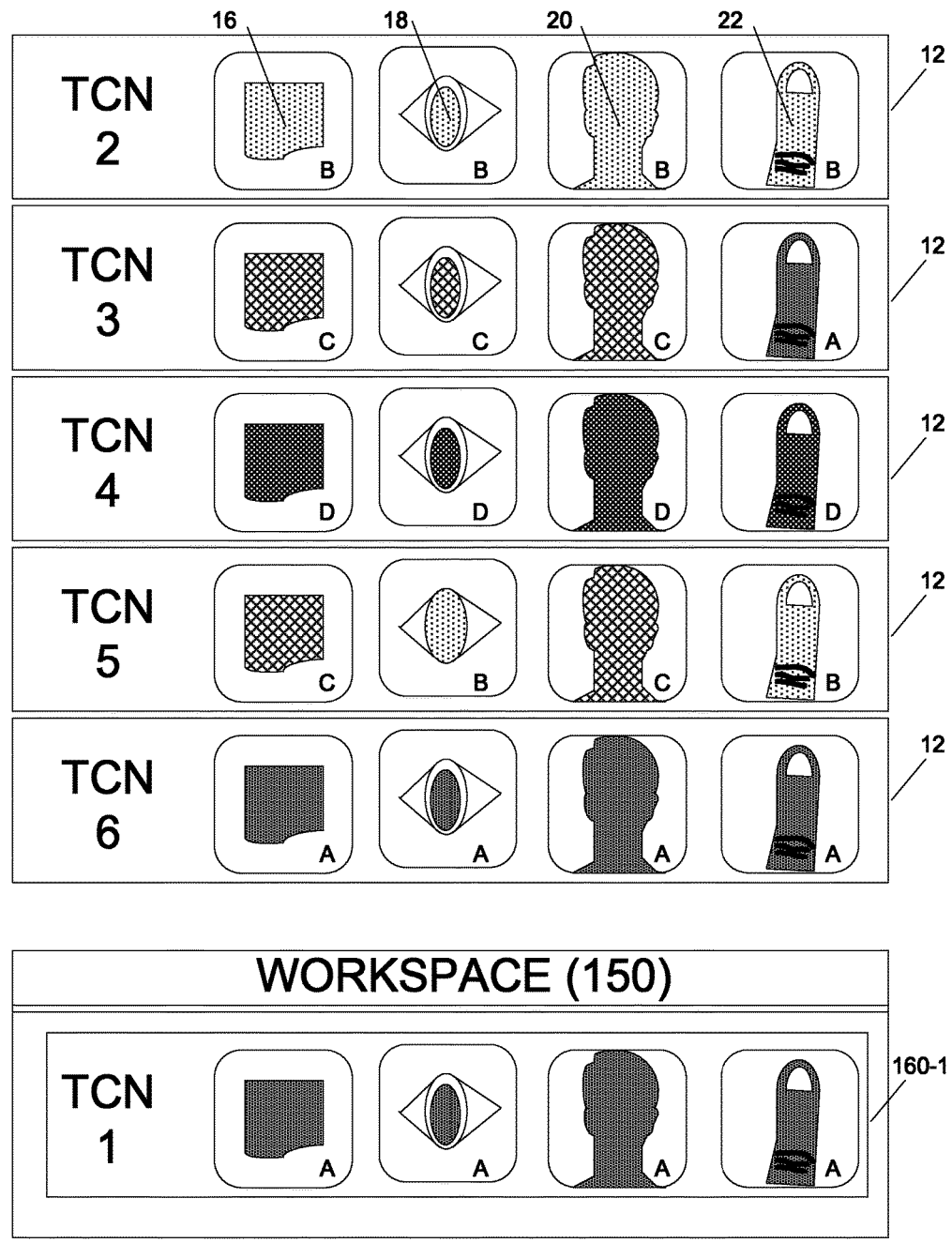

FIG. 5B shows the set of biometric records after the analysis of the biometric record for TCN 1. Because there are no entities currently in the workplace 150, no matches can occur between any of the modalities of TCN 1 and modalities of entities in the workplace 150. Accordingly, as illustrated by steps 106-112 in FIG. 4A, a new entity 160-1 is created in the workspace, and each of the modalities of TCN 1 are, in turn, added to this new entity 160-1. The result is a workspace entity 160-1 that appears to be a copy of the biometric record corresponding to TCN 1. For purposes of simplification, the original biometric record 12 for TCN 1 is omitted from FIG. 5B. In practice, each original biometric record 12 may be retained in the biometric record database 70 (FIG. 4A) or discarded.

Figure 5C:
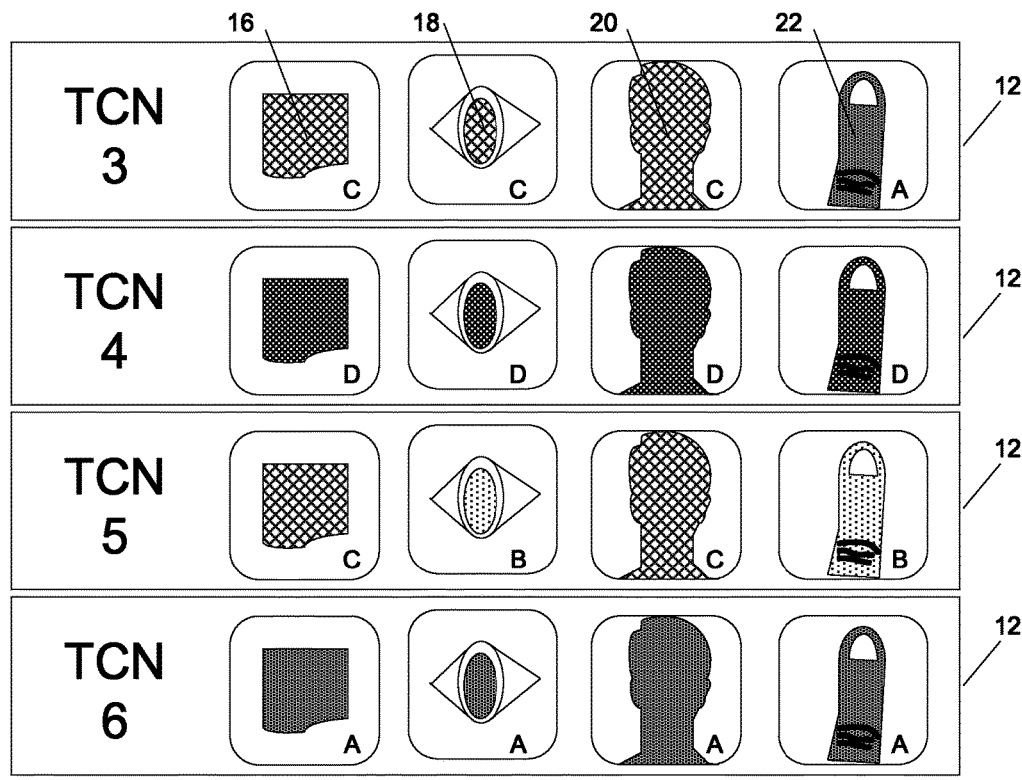
Figure 5C:
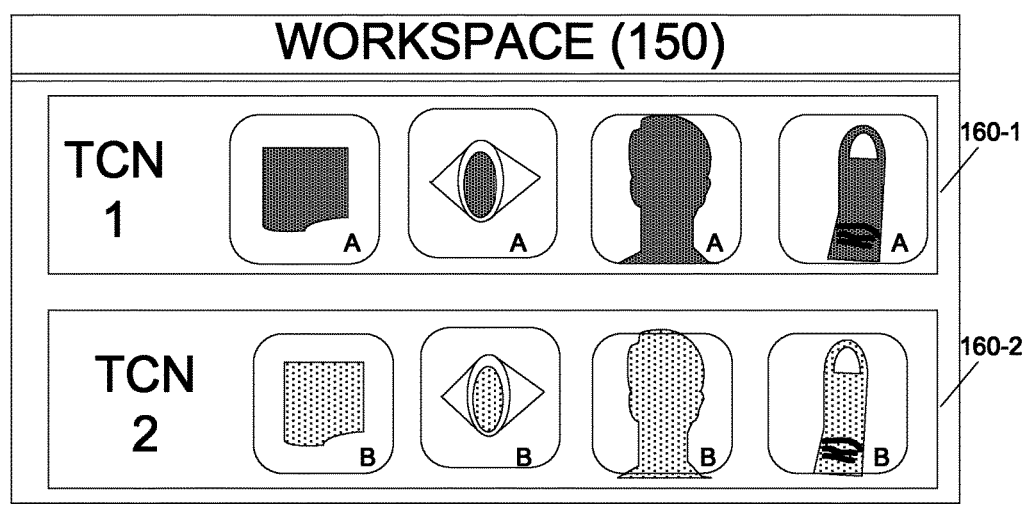

FIG. 5C shows the set of biometric records after the analysis of the next probe record, TCN 2. Each of the modalities of the probe record, TCN 2, taken in turn, does not match a corresponding modality of each workspace entity (presently, there being only one such entity 160-1 in the workplace 150 arising from the first biometric record processed, namely, TCN 1). Steps 106-112 in FIG. 4A result in a new entity 160-2 in the workspace, with each of the modalities of TCN 2 being added, in sequence, to this new entity 160-2. The result is a workspace entity that appears to be a copy of biometric record corresponding to TCN 2. In addition, the workspace 150 presently contains two workspace entities 160-1, 160-2.

Figure 5D:
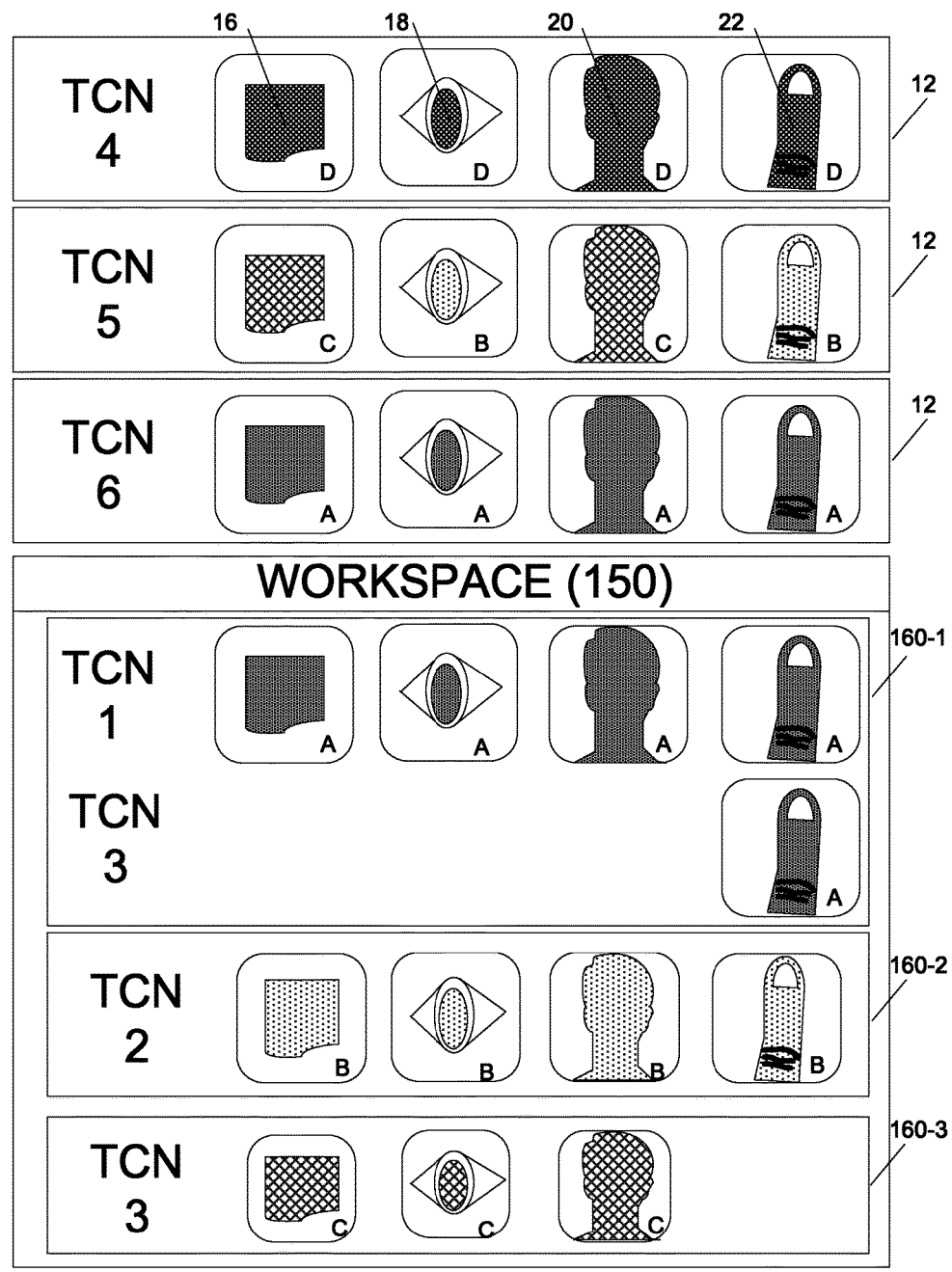

FIG. 5D shows the set of biometric records after the analysis of the next probe record, TCN 3. This biometric record has three modalities (text 16, face image 20, and iris 18) that do not match any corresponding modality in either of the two workspace entities 160-1, 160-2. The search for a match for the text modality results in a new entity 160-3 in the workspace (according to steps 106-110 in FIG. 4A). When each of face and iris modalities of TCN 3 are processed, each is added to this new entity in accordance with steps 106, 108 and 112. The fingerprint modality of TCN 3, on the other hand, matches the fingerprint modality in the workspace entity 160-1 corresponding to TCN 1. Steps 118, 120 (FIG. 4B) cause this fingerprint modality to be removed from the original biometric record TCN 3 and merged with the workspace entity 160-1 corresponding to TCN 1. In effect, the fingerprint modality has been split from the original biometric record TCN 3 and merged with the original biometric TCN 1; workspace entity 160-3 corresponds to the original biometric record TCN 3 from which the fingerprint modality has been split, and workspace entity 160-1 corresponds to the original biometric record TCN 1 with which the fingerprint modality has merged.

After, the workspace 150 contains three entities, a first entity 160-1 corresponding to the biometric record TCN 1 that now includes the merged fingerprint taken from TCN 3, a second entity 160-2 resulting from the biometric record TCN 2, and a third entity 160-3 derived from the biometric record TCN 3, but lacking the fingerprint image 22. The identification "TCN 3" can become associated with the first entity 160-1, the third entity 160-3, or both (as shown).

Figure 5E:
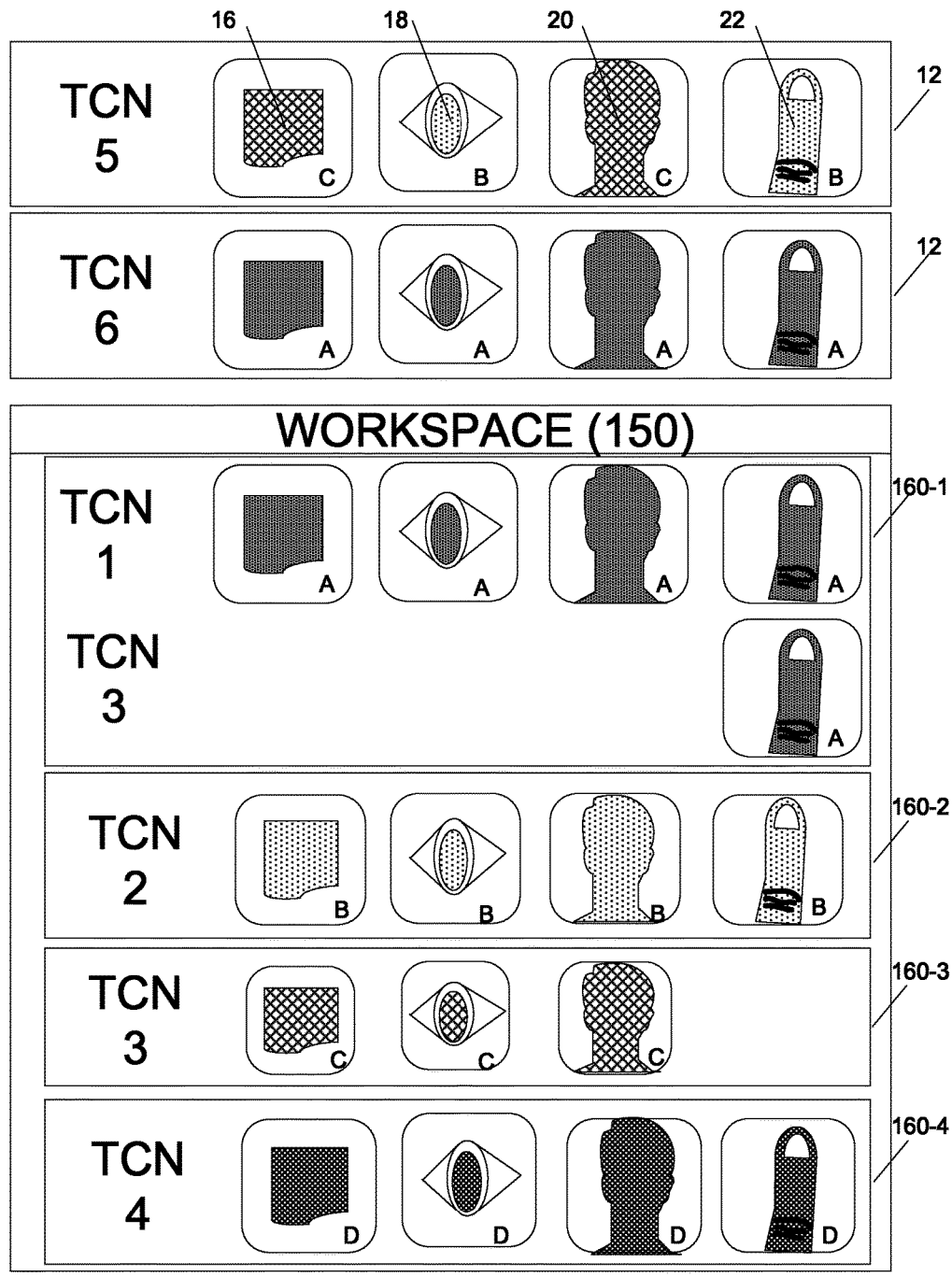

FIG. 5E shows the set of biometric records after the analysis of the next probe record, TCN 4. Each of the modalities 16, 18, 20, 22 of this probe record (TCN 4) does not match a corresponding modality of any of the workspace entities 160-1, 160-2, 160-3. Steps 106-112 in FIG. 4A result in a new entity 160-4 in the workspace 150, with each of the modalities of TCN 4 being iteratively added to this new entity 160-4. This new entity 160-4 joins the three other entities 160-1, 160-2, and 160-3 presently in the workspace 150; in effect, the new entity 160-4 corresponds directly to the original biometric record TCN 4.

Figure 5F:
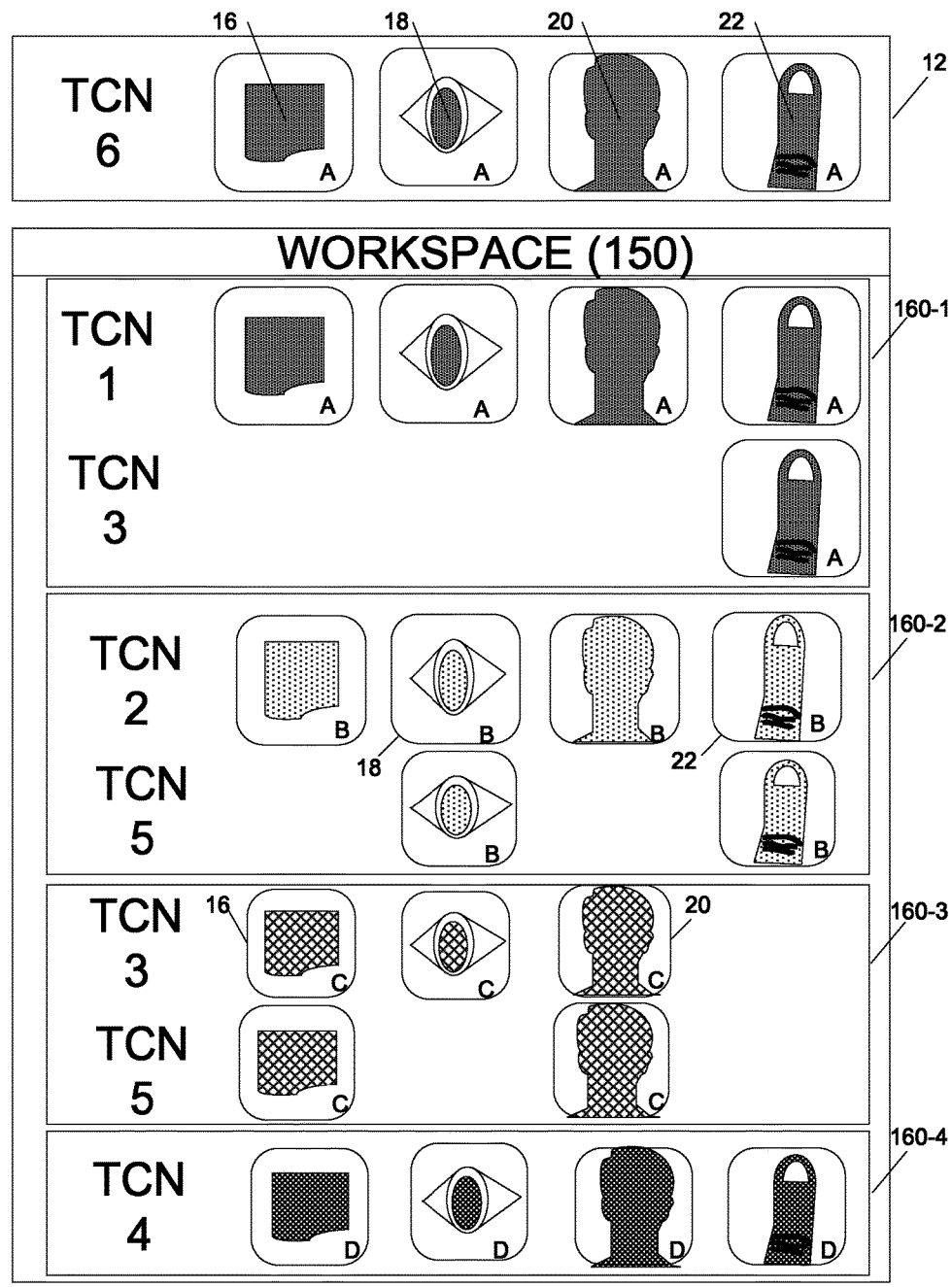
Figure 5G:
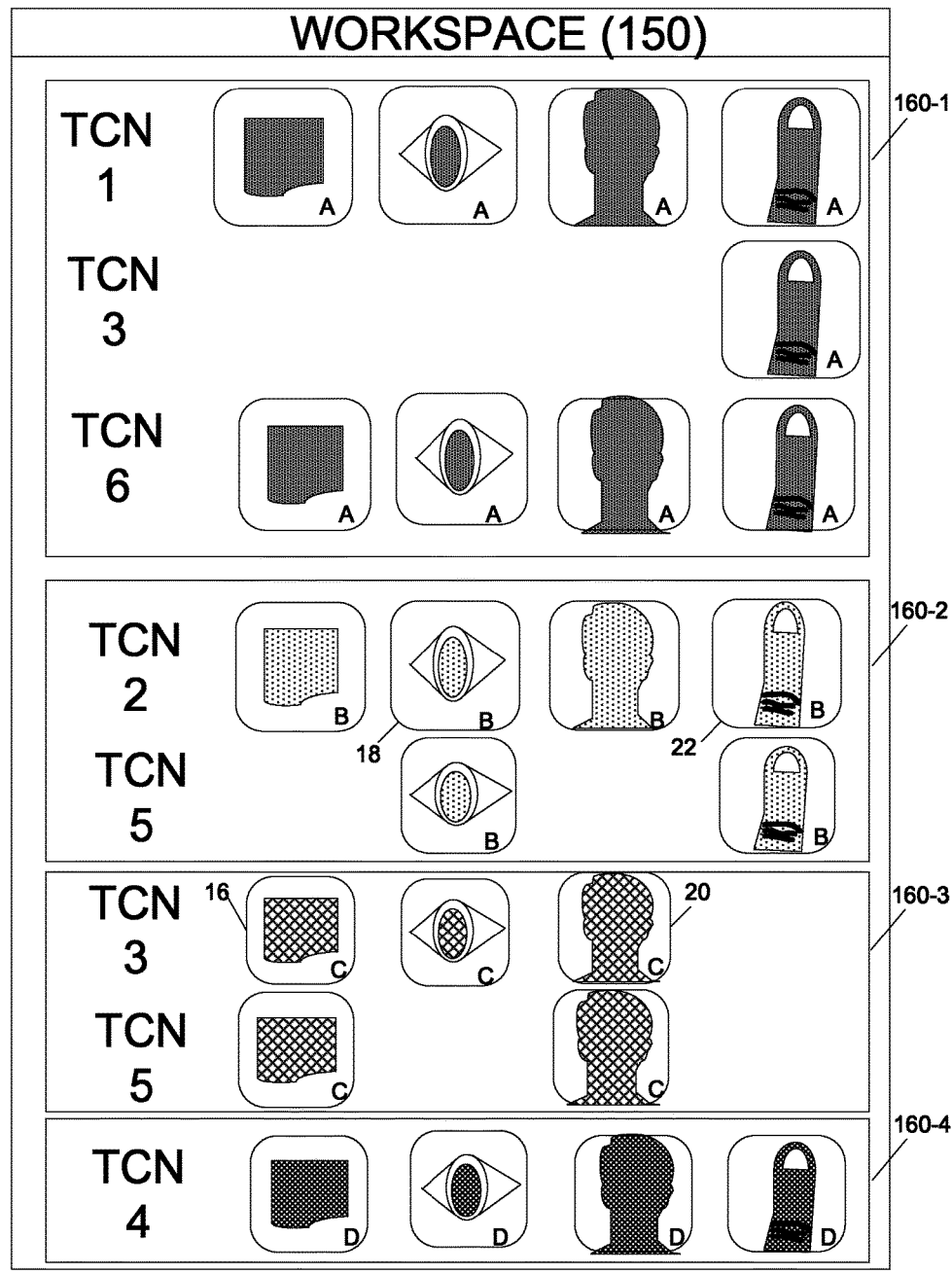

FIG. 5F shows the set of biometric records after the analysis of the next probe record, TCN 5. This biometric record contains text 16 and a face image 20 that matches the text 16 and face image 20, respectively, of the third workspace entity 160-3, and a fingerprint and iris that match their respective modalities of the workspace entity 160-2. Steps 118, 120 in FIG. 4B cause the text and face image modalities to be removed (or copied) from the TCN 5 (each modality being processed one at a time) and merged with the workspace entity 160-3. These same steps, when applied to the other modalities, cause the fingerprint and iris image modalities to be removed (or copied) from the biometric record (TCN 5) 12 and merged with the workspace entity 160-2 (also, one modality during each iteration of the process 100). The identification "TCN 5" can become associated with the second entity 160-2, the third entity 160-3, or both (as shown). In effect, the original biometric record TCN 5 no longer exists (in this simple example), all of its modalities having been split from the biometric record TCN 5 and merged with another biometric record. Notwithstanding, a copy of the original biometric record TCN 5 can be saved, for example, for archival purposes.

FIG. 5F shows the set of biometric records after the analysis of the next probe record, TCN 5, TCN 6. This biometric record contains text 16, a face image 20, fingerprint 22, and iris 18 that match the text, face image, fingerprint, and iris, respectively, of the workspace entity 160-1. With each modality being processed in sequence, steps 118-120 in FIG. 4B cause the text, face image, fingerprint, and iris modalities to be removed from the biometric record TCN 6 and merged with the workspace entity 160-1. In effect, the original biometric record TCN 6 has merged with the original biometric record TCN 1, which was previously modified by the addition of the fingerprint modality split from the original biometric record TCN 3.

Because biometric records with orphaned modalities are generally unwanted, the process 100 can include an additional process, after all original biometric records 12 are processed or after completing a given probe record, to determine whether the processing of the full probe record produced a workspace entity with an orphaned modality. If so, a decision can be made to move each biometric sample (there may be more than one) of the orphaned modality from that workspace entity to another workspace entity. The process 100 can merge the biometric sample(s) with multiple entities where there is uncertainty as to which particular workspace entity to move the biometric sample(s).

At the completion of the process 100, after the processing of every original biometric record 12, each entity 160 within the workspace 150 is not cross-linked. These workspace entities may be written back to the data repository 70 (FIG. 4A) as repaired biometric records.

Figure 6:
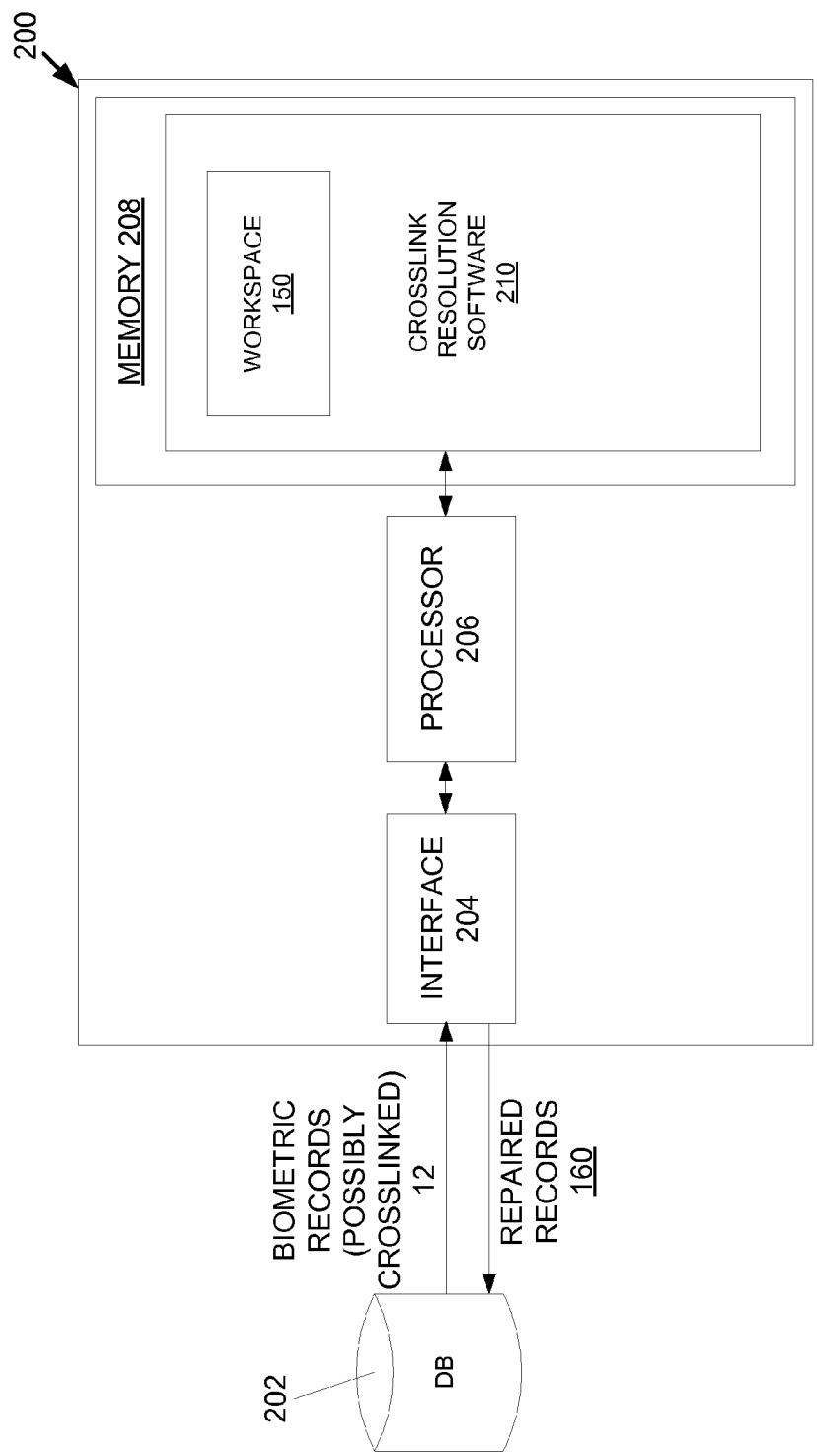
FIG. 6 is a block diagram of an embodiment of a computing system for detecting and repairing cross-linked biometric records.

FIG. 6 shows an embodiment of a computing system 200 for detecting and repairing cross-linked biometric records. The computing system 200 is in communication with a database 202 containing biometric records 12 (FIG. 1). The communication can be across a network (not shown), embodiments of which include, but are not limited to, local-area networks (LAN), metro-area networks (MAN), and wide-area networks (WAN), such as the Internet or World Wide Web. The computing system 200 can connect to the database 202 through one or more of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11 (g)).

The computing system 200 includes an interface 204, a processor 206, and memory 208. Example implementations of the computing system 200 include, but are not limited to, personal computers (PC), Macintosh computers, server computers, blade servers, workstations, laptop computers, kiosks, hand-held devices, such as a personal digital assistant (PDA), mobile phones, smartphones, tablets, Apple iPads™, Amazon.com KINDLEs®, and network terminals. The interface 204 is in communication with the database 202 from which to receive the biometric records 12, including any cross-linked records, and towards which to transmit repaired biometric records 160 (FIG. 5G) for storage within the database 202.

The processor 206 executes a cross-link resolution program 210 stored in the memory 208. In brief, the cross-link resolution program 210 removes cross-linking from biometric records by splitting, merging, or generating new biometric records as previously described in connection with FIGS. 4A-4C. In the performance of its objective, the cross-link resolution program 210 uses a workspace 150, which is a portion of the memory 208 used to hold the workspace entities 160 temporarily before processor 206 writes these workspace entities 160 back to the database 202, storing them as repaired biometric records. Each stored record 160 can include a flag, status, or other form of identification indicating that the particular record has resulted from a cross-link analysis.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of this invention.

The invention claimed is:

1. A method of repairing cross-linked biometric records to reduce a number of incorrect fields associated with an individual, the individual capable of having multiple records, comprising:
receiving a set of biometric records, each biometric record containing at least one biometric sample in a non-textual modality stored in a field, one or more of the biometric records in the set of biometric records being a cross-linked biometric record having at least two biometric samples that are associated with different individuals;
performing cross-link resolution on the set of biometric records to reduce a number of incorrect biometric samples contained in record fields by searching for a match between a biometric sample, stored in a field of a first record, and a corresponding field in each of the other biometric records in the set of biometric records and, based on a matching threshold, declaring whether a match exists;
performing, based on a number of matches, an action to reduce the number of incorrect fields, the action including removing one of the matching biometric samples from one of the first biometric record and a second biometric record and adding the removed biometric sample to the other of the first and second biometric records; and
outputting at least one repaired biometric record.

2. The method of claim 1, further comprising:
finding a match between a first biometric sample in the given non-textual modality in the first biometric record in the set of biometric records and a second biometric sample in the given non-textual modality in the second biometric record in the set of biometric records.

3. The method of claim 1, further comprising:
finding a match between a first biometric sample in the given non-textual modality in a first biometric record in the set of biometric records and a second biometric sample in the given non-textual modality in second biometric record in the set of biometric records, wherein the other of the first and second biometric records is a newly generated biometric record.

4. The method of claim 3, further comprising:
removing the second biometric sample from the second biometric record; and
adding the second biometric sample to the new biometric record.

5. The method of claim 1, further comprising:
finding multiple matches between a first biometric sample in the given non-textual modality in a first biometric record in the set of biometric records and multiple biometric samples in the given non-textual modality in the other biometric records in the set of biometric records; and
removing the first biometric sample from the first biometric record.

6. The method of claim 5, further comprising:
determining that all of the multiple matches are between the first biometric sample of the first biometric record and biometric samples of a second biometric record in the set of biometric records; and
adding the first biometric sample to the second biometric record.

7. The method of claim 5, further comprising:
determining that the multiple matches are between the first biometric sample of the first biometric record and a biometric sample from each of at least two other biometric records in the set of biometric records;
determining that the biometric sample from each of the at least two other biometric records satisfies a matching threshold;
removing, from a first one of the at least two other biometric records, the biometric sample that satisfies the matching threshold;
adding the biometric sample removed from the first one of the at least two other biometric records to a second one of the at least two other biometric records; and
adding the first biometric sample removed from the first biometric record to the second one of the at least two other biometric records.

8. The method of claim 7, wherein the biometric sample removed from the first one of the at least two other biometric records is least similar, of the biometric samples of the at least two other biometric records, to the first biometric sample of the first biometric record.

9. The method of claim 1, wherein the biometric sample of a non-textual modality is one of a full or partial fingerprint, a full or partial palm print, an image of an iris, a facial image, a full or partial foot print, a DNA profile, an image of a retina, and a voice recording.

10. The method of claim 1, further comprising preprocessing, prior to performing cross-link resolution, each biometric sample in a given non-textual modality in each biometric record in the set of biometric records into a format suitable for performing the cross-link resolution.

11. A non-transitory computer readable information storage media having stored thereon instructions, that when executed by one or more processors; cause to be performed a method for repairing cross-linked biometric records to reduce a number of incorrect fields associated with an individual, the individual capable of having have multiple associated records, comprising:
receiving a set of biometric records, each biometric record containing at least one biometric sample in a non-textual modality stored in a field, one or more of the biometric records in the set of biometric records being a cross-linked biometric record having at least two biometric samples that are associated with different individuals;
performing cross-link resolution on the set of biometric records to reduce a number of incorrect biometric samples contained in record fields by searching for a match between a biometric sample, stored in a field of a first record, and a corresponding field in each of the other biometric records in the set of biometric records and, based on a matching threshold, declaring whether a match exists;

performing, based on a number of matches, an action to reduce the number of incorrect fields, the action including removing one of the matching biometric samples from one of the first biometric record and a second biometric record and adding the removed biometric sample to the other of the first and second biometric records; and outputting at least one repaired biometric record.

12. The media of claim 11, further comprising:
finding a match between a first biometric sample in the given non-textual modality in a first biometric record in the set of biometric records and a second biometric sample in the given non-textual modality in the second biometric record in the set of biometric records.

13. The media of claim 11, further comprising:
finding a match between a first biometric sample in the given non-textual modality in a first biometric record in the set of biometric records and a second biometric sample in the given non-textual modality in the second biometric record in the set of biometric records, wherein the other of the first and second biometric records is a newly generated biometric record;
removing the first biometric sample from the first biometric record; and
adding the first biometric sample to the new biometric record.

14. The media of claim 13, further comprising:
removing the second biometric sample from the second biometric record; and
adding the second biometric sample to the new biometric record.

15. The media of claim 11, further comprising:
finding multiple matches between a first biometric sample in the given non-textual modality in a first biometric record in the set of biometric records and multiple biometric samples in the given non-textual modality in the other biometric records in the set of biometric records; and
removing the first biometric sample from the first biometric record.

16. The media of claim 15, further comprising:
determining that all of the multiple matches are between the first biometric sample of the first biometric record and biometric samples of a second biometric record in the set of biometric records;
adding the first biometric sample to the second biometric record.

17. The media of claim 15, further comprising:
determining that the multiple matches are between the first biometric sample of the first biometric record and a biometric sample from each of at least two other biometric records in the set of biometric records;
determining that each biometric sample from each of the at least two other biometric records satisfies a matching threshold;
removing, from a first one of the at least two other biometric records, the biometric sample that satisfies the matching threshold;
computer readable program code that, if executed, adds the biometric sample removed from the first one of the at least two other biometric records to a second one of the at least two other biometric records; and adding the first biometric sample removed from the first biometric record to the second one of the at least two other biometric records.

18. The media of claim 17, wherein the biometric sample removed from the first one of the at least two other biometric records is least similar, of the biometric samples of the at least two other biometric records, to the first biometric sample of the first biometric record.

19. The media of claim 11, wherein the biometric sample of a non-textual modality is one of a full or partial fingerprint, a full or partial palm print, an image of an iris, a facial image, a full or partial foot print, a DNA profile, an image of a retina, and a voice recording.

20. The media of claim 11, further comprising computer preprocessing, prior to cross-link resolution, each biometric sample in a given non-textual modality in each biometric record in the set of biometric records into a format suitable for performing the cross-link resolution.

21. A computer system for repairing cross-linked biometric records to reduce a number of incorrect fields associated with an individual, the individual capable of having have multiple associated records, the computer system comprising:
memory storing program code that, if executed, performs cross-link resolution on biometric records; and
a processor programmed to receive a set of biometric records, each biometric record containing at least one biometric sample in a non-textual modality stored in a field, one or more of the biometric records in the set of biometric records being a cross-linked biometric record having at least two biometric samples that are associated with multiple different individuals, the processor executing the program code stored in memory to: perform cross-link resolution on the set of biometric records to repair each cross-linked biometric record in the set to reduce a number of incorrect fields in a biometric record, wherein the cross-link resolution includes searching for a match between a biometric sample; stored in a first field of a record, and a corresponding field in each of the other biometric records in the set and, based on a matching threshold, declaring whether a match exists, performing, based on a number of matches, an action to reduce the number of incorrect fields, the action including removing one of the matching biometric samples from one of the first biometric record and a second biometric record and adding the removed biometric sample to the other of the first and second biometric records and outputting at least one repaired biometric record.

22. The computer system of claim 21, wherein the cross-link resolution performed by the processor includes finding a match between a first biometric sample in the given non-textual modality in a first biometric record in the set of biometric records and a second biometric sample in the given non-textual modality in the second biometric record in the set of biometric records.

23. The computer system of claim 21, wherein the cross-link resolution performed by the processor includes finding a match between a first biometric sample in the given non-textual modality in a first biometric record in the set of biometric records and a second biometric sample in the given non-textual modality in a second biometric record in the set of biometric records, wherein the other of the first and second biometric record is a newly generated biometric record.

24. The computer system of claim 23, wherein the cross-link resolution performed by the processor further includes removing the second biometric sample from the second biometric record, and adding the second biometric sample to the new biometric record.

\* \* \* \* \*